United States Patent
Jiang (10) Patent No.: US 11,346,743 B2
(45) Date of Patent: May 31, 2022

(54) SEALING PERFORMANCE TEST METHOD, APPARATUS, AND STORAGE MEDIUM

(71) Applicant: Huawei Technologies Co., Ltd., Shenzhen (CN)

(72) Inventor: Jin Jiang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 528 days.

(21) Appl. No.: 16/341,327

(22) PCT Filed: Oct. 12, 2016

(86) PCT No.: PCT/CN2016/101897
§ 371 (c)(1),
(2) Date: Apr. 11, 2019

(87) PCT Pub. No.: WO2018/068226
PCT Pub. Date: Apr. 19, 2018

(65) Prior Publication Data
US 2019/0360889 A1    Nov. 28, 2019

(51) Int. Cl.
*G01M 3/32* (2006.01)
*G06F 17/18* (2006.01)
(Continued)

(52) U.S. Cl.
CPC .......... *G01M 3/3272* (2013.01); *G01M 3/329* (2013.01); *G06F 17/18* (2013.01); *G01M 3/00* (2013.01); *G01M 3/02* (2013.01)

(58) Field of Classification Search
CPC ...... G01M 3/3272; G01M 3/329; G01M 3/00; G01M 3/02; G01M 99/005; G01M 3/26; G06F 17/18
See application file for complete search history.

(56) References Cited

U.S. PATENT DOCUMENTS

2002/0184769 A1    12/2002    Van Der Meer
2006/0081635 A1    4/2006    Matsutori et al.
(Continued)

FOREIGN PATENT DOCUMENTS

CN    1760094 A    4/2006
CN    101710018 A    5/2010
(Continued)

OTHER PUBLICATIONS

Backer et al., "[Guide] Test flap waterproofing without water!" available at https://forum.xda-developers.com/t/guide-test-flap-waterproofing-without-water.2897886/ (Year: 2014).*
(Continued)

*Primary Examiner* — John C Kuan
(74) *Attorney, Agent, or Firm* — Conley Rose, P.C.

(57) ABSTRACT

A sealing performance test method, an apparatus, and a storage medium, where the method includes obtaining a first atmospheric pressure value after a component configured to seal the apparatus is installed in the apparatus, where the first atmospheric pressure value is an atmospheric pressure value at inside of the apparatus when a pressure is applied to the apparatus, calculating an atmospheric pressure difference between the first atmospheric pressure value and an atmospheric pressure value at outside of the apparatus, and determining sealing performance of the apparatus based on the atmospheric pressure difference. Therefore, sealing performance of the apparatus can be quickly and accurately tested.

13 Claims, 2 Drawing Sheets

After a component used to seal an apparatus is removed from the apparatus, apply a pressure to the apparatus and maintain the pressure; and when the component is installed in the apparatus and the pressure applied to the apparatus is released, obtain a second atmospheric pressure value inside the apparatus — 201

↓

Calculate a second atmospheric pressure difference, where the second atmospheric pressure difference is a difference between an atmospheric pressure value outside the apparatus and the second atmospheric pressure value — 202

↓

Determine sealing performance of the apparatus based on the second atmospheric pressure difference — 203

(51) Int. Cl.
*G01M 3/00* (2006.01)
*G01M 3/02* (2006.01)

(56) References Cited

U.S. PATENT DOCUMENTS

| | | | |
|---|---|---|---|
| 2012/0243854 A1* | 9/2012 | Takimoto | G03B 17/08 396/26 |
| 2014/0165708 A1 | 6/2014 | Konrath et al. | |
| 2014/0260550 A1* | 9/2014 | Kil | G01M 3/3272 73/40 |
| 2015/0241298 A1 | 8/2015 | Decker | |
| 2016/0005296 A1* | 1/2016 | Kil | G01M 3/002 340/604 |
| 2016/0143611 A1* | 5/2016 | Ota | A61B 6/586 378/207 |

FOREIGN PATENT DOCUMENTS

| | | |
|---|---|---|
| CN | 102607776 A | 7/2012 |
| CN | 102721517 A | 10/2012 |
| CN | 102749179 A | 10/2012 |
| CN | 103884479 A | 6/2014 |
| CN | 103940558 A | 7/2014 |
| CN | 205288781 U | 6/2016 |
| JP | H07151637 A | 6/1995 |
| JP | H1137890 A | 2/1999 |
| JP | 2009121965 A | 6/2009 |
| JP | 2011080861 A | 4/2011 |
| JP | 2012163539 A | 8/2012 |
| JP | 2014119456 A | 6/2014 |
| JP | 2015530580 A | 10/2015 |
| KR | 20140111865 A | 9/2014 |
| KR | 20150143187 A | 12/2015 |
| KR | 20160004850 A | 1/2016 |
| KR | 20160052217 A | 5/2016 |

OTHER PUBLICATIONS

Mr.Tom_Tom et al., "[APP][4.4+][Open BETA]Waterproof Quickcheck 0.93" available at https://forum.xda-developers.com/t/app-4-4-open-beta-waterproof-quickcheck-0-93.3189611/ (Year: 2015).*
Machine Translation and Abstract of Chinese Publication No. CN103884479, Jun. 25, 2014, 16 pages.
Machine Translation and Abstract of Chinese Publication No. CN103940558, Jul. 23, 2014, 16 pages.
Machine Translation and Abstract of Chinese Publication No. CN205288781, Jun. 8, 2016, 7 pages.
Foreign Communication From a Counterpart Application, PCT Application No. PCT/CN2016/101897, English Translation of International Search Report dated Jul. 12, 2017, 2 pages.
Foreign Communication From a Counterpart Application, PCT Application No. PCT/CN2016/101897, English Translation of Written Opinion dated Jul. 12, 2017, 4 pages.
Foreign Communication From a Counterpart Application, Chinese Application No. 201680055861.7, Chinese Office Action dated Dec. 4, 2019, 6 pages.

* cited by examiner

SEALING PERFORMANCE TEST METHOD, APPARATUS, AND STORAGE MEDIUM

CROSS-REFERENCE TO RELATED APPLICATIONS

This application is a U.S. National Stage of International Patent Application No. PCT/CN2016/101897 filed on Oct. 12, 2016, which is hereby incorporated by reference in its entirety.

TECHNICAL FIELD

The present invention relates to the field of sealing performance test technologies, and specifically, to a sealing performance test method, an apparatus, and a storage medium.

BACKGROUND

Currently, more apparatuses (for example, electronic devices such as smartphones, wearable devices, and tablet computers) have a waterproof function. When an apparatus becomes faulty, whether a waterproof function of the apparatus fails usually needs to be tested.

When the waterproof function fails, an enclosed cavity inside the apparatus leaks air. Therefore, to test whether the waterproof function of the apparatus fails, sealing performance of the apparatus is usually tested by using a specialized device such as a leak detector. The existing method for testing sealing performance of an apparatus has problems such as high costs, a high test error rate, and high power consumption.

SUMMARY

Embodiments of the present invention provide a sealing performance test method, an apparatus, and a storage medium, to accurately and efficiently test sealing performance of an apparatus at relatively low costs.

A first aspect of the embodiments of the present invention provides a sealing performance test method, including:

after a component used to seal an apparatus is installed in the apparatus, obtaining a first atmospheric pressure value, where the first atmospheric pressure value is an atmospheric pressure value inside the apparatus when a pressure is applied to the apparatus; calculating a first atmospheric pressure difference, where the first atmospheric pressure difference is a difference between the first atmospheric pressure value and an atmospheric pressure value outside the apparatus; and determining sealing performance of the apparatus based on the first atmospheric pressure difference.

In this embodiment of the present invention, the sealing performance of the apparatus is determined based on the atmospheric pressure difference between the atmospheric pressure value outside the apparatus and the atmospheric pressure value inside the apparatus. Because no external device for air tightness test is introduced, costs are reduced. In addition, because a connecting pipeline of an external test device does not need to be used, it is avoided that the external connecting pipeline introduces a problem such as a test error, and test accuracy is improved. Because a test procedure is simple, the sealing performance of the apparatus can be relatively quickly determined, and test efficiency is improved.

Optionally, in some possible implementations of the present invention, a component used to seal the apparatus may be a card tray.

Optionally, in some possible implementations of the present invention, a pressure may be applied to the apparatus by placing an object such as a counterpoise with a preset weight on a surface of the apparatus. Certainly, a pressure may be alternatively applied to the apparatus by directly pressing the apparatus or by placing another object. It should be noted that if a pressure is applied by placing an object such as a counterpoise with a particular weight, an operation is more convenient, a standard operation is facilitated, and test efficiency is improved.

Optionally, in some possible implementations of the present invention, the first atmospheric pressure value may be obtained by using a barometer disposed in a sealed cavity of the apparatus.

Optionally, in some possible implementations of the present invention, the determining sealing performance of the apparatus based on the first atmospheric pressure difference includes: determining whether the first atmospheric pressure difference is greater than or equal to a preset first threshold, where the first atmospheric pressure difference is a difference between the first atmospheric pressure value and the atmospheric pressure value outside the apparatus; and when the first atmospheric pressure difference is greater than or equal to the preset first threshold, determining that the sealing performance of the apparatus is desirable; or when the first atmospheric pressure difference is less than the preset first threshold, determining that the sealing performance of the apparatus is poor.

It should be noted that the atmospheric pressure value outside the apparatus may be considered to be equal to one standard atmospheric pressure. To improve precision, the atmospheric pressure value outside the apparatus may alternatively be obtained by using a barometer in communication with external air, for example, may be obtained by using a barometer that is disposed in a headphone jack of the apparatus. Specifically, the barometer that is disposed in the headphone jack may be electrically connected to a mainboard of the apparatus. It should be noted that the atmospheric pressure value outside the apparatus may be alternatively obtained by using the barometer disposed inside the sealed cavity of the apparatus when the component used to seal the apparatus is opened.

Optionally, in some possible implementations of the present invention, to improve interactivity and test precision, the first atmospheric pressure value, the atmospheric pressure value outside the apparatus, the first atmospheric pressure difference, and/or a test result of the sealing performance of the apparatus may be displayed in a display interface of the apparatus. That is, one or more of the first atmospheric pressure value, the atmospheric pressure value outside the apparatus, the first atmospheric pressure difference, and the test result may be displayed in the display interface of the apparatus. When the test result of the sealing performance of the apparatus is displayed, the test result may be displayed in one or more forms such as text, sound, and icons in different colors.

Optionally, in some possible implementations of the present invention, the atmospheric pressure value outside the apparatus may be obtained by using a barometer outside the sealed cavity of the apparatus, and the atmospheric pressure value inside the apparatus, that is, the first atmospheric pressure value may be obtained by using the barometer inside the sealed cavity of the apparatus. The atmospheric pressure value outside the apparatus and the first atmospheric pressure value are displayed in a display interface of the apparatus in real time. After the component used to seal the apparatus is removed, the component is installed in the apparatus again only when the first atmospheric pressure value inside the apparatus displayed in the display interface is equal to the atmospheric pressure value outside the apparatus. If the sealing performance of the apparatus is desirable, after the component used to seal the apparatus is installed in the apparatus and a pressure is applied to the apparatus, the first atmospheric pressure value increases, that is, there is a gradual change process. When there is no change, a corresponding value is used as the first atmospheric pressure value. In this way, test accuracy is improved.

A second aspect of the embodiments of the present invention provides a sealing performance test method, including:

after a component used to seal an apparatus is removed from the apparatus, applying a pressure to the apparatus and maintain the pressure; and when the component used to seal the apparatus is installed in the apparatus and the pressure applied to the apparatus is released, obtaining a second atmospheric pressure value inside the apparatus; calculating a second atmospheric pressure difference, where the second atmospheric pressure difference is a difference between an atmospheric pressure value outside the apparatus and the second atmospheric pressure value; and determining sealing performance of the apparatus based on the second atmospheric pressure difference.

Optionally, in some possible implementations of the present invention, the second atmospheric pressure value is obtained by using a barometer disposed in a sealed cavity of the apparatus.

Optionally, in some possible implementations of the present invention, the determining sealing performance of the apparatus based on the second atmospheric pressure difference includes: determining whether the second atmospheric pressure difference is greater than or equal to a preset second threshold, where the second atmospheric pressure difference is a difference between the atmospheric pressure value outside the apparatus and the second atmospheric pressure value; and when the second atmospheric pressure difference is greater than or equal to the preset second threshold, determining that the sealing performance of the apparatus is desirable; or when the second atmospheric pressure difference is less than the preset second threshold, determining that the sealing performance of the apparatus is poor.

Optionally, in some possible implementations of the present invention, to improve test intuitiveness, the second atmospheric pressure value, the atmospheric pressure value outside the apparatus, the second atmospheric pressure difference, and/or a test result of the sealing performance of the apparatus may be displayed in a display interface of the apparatus. That is, one or more of the second atmospheric pressure value, the atmospheric pressure value outside the apparatus, the second atmospheric pressure difference, and the test result may be displayed in the display interface of the apparatus. When the test result of the sealing performance of the apparatus is displayed, the test result may be displayed in one or more forms such as text, sound, and icons in different colors.

Optionally, in some possible implementations of the present invention, to improve test precision, a pressure may be applied to the apparatus by using a method of placing an object with a preset weight on a surface of the apparatus, and the object with a preset weight may be a common object such as a counterpoise. The component used to seal the apparatus may be a component such as a card tray. When the card tray is removed from the apparatus, the atmospheric pressure value outside the apparatus and the second atmospheric pressure value inside the apparatus may be displayed in the display interface of the apparatus in real time. The card tray is installed in the apparatus to perform a seal operation on the apparatus only when the second atmospheric pressure value inside the apparatus displayed in the display interface is equal to the atmospheric pressure value outside the apparatus. If the sealing performance of the apparatus is desirable, after the card tray is installed in the apparatus and the pressure applied to the apparatus is released, the second atmospheric pressure value decreases, that is, there is a gradual change process. When there is no change, a corresponding value is used as the second atmospheric pressure value his way, test accuracy is improved.

Optionally, in some possible implementations of the present invention, to improve test accuracy, a preset area may be displayed in the display interface of the apparatus, to indicate that the pressure is applied in the preset area. For example, an object with a preset weight is placed in the preset area. For example, a circle may be displayed in the display interface of the apparatus to indicate that an object with a preset weight is placed in the circle.

Optionally, in some possible implementations of the present invention, to reduce costs, the atmospheric pressure value outside the apparatus may be obtained by using a barometer disposed in a sealed cavity of the apparatus. That is, after the component used to seal the apparatus is removed from the apparatus, an atmospheric pressure value obtained by the barometer in the sealed cavity of the apparatus is used as the atmospheric pressure value outside the apparatus.

Optionally, in some possible implementations of the present invention, to reduce costs and improve flexibility, the atmospheric pressure value outside the apparatus may be obtained from an external device configured to measure an atmospheric pressure value.

Optionally, to improve test accuracy, apparatuses of different models may correspond to different second atmospheric pressure differences.

A third aspect of the embodiments of the present invention provides an apparatus. The apparatus includes a first processing unit, a first calculation unit, and a first determining unit.

The first processing unit is configured to: after a component used to seal an apparatus is installed in the apparatus, obtain a first atmospheric pressure value, where the first atmospheric pressure value is an atmospheric pressure value inside the apparatus when a pressure is applied to the apparatus. The first calculation unit is configured to calculate a first atmospheric pressure difference, where the first atmospheric pressure difference is a difference between the first atmospheric pressure value and an atmospheric pressure value outside the apparatus. The first determining unit is configured to determine sealing performance of the apparatus based on the first atmospheric pressure difference.

The atmospheric pressure value inside the apparatus may be obtained by using a barometer disposed in a sealed cavity of the apparatus.

The first determining unit may be specifically configured to: determine whether the first atmospheric pressure difference is greater than or equal to a preset first threshold, where the first atmospheric pressure difference is a difference between the first atmospheric pressure value and the atmospheric pressure value outside the apparatus; and when the first atmospheric pressure difference is greater than or equal to the preset first threshold, determine that the sealing performance of the apparatus is desirable; or when the first atmospheric pressure difference is less than the preset first threshold, determine that the sealing performance of the apparatus is poor.

The apparatus further includes a display unit. The display unit is configured to display the first atmospheric pressure value, the atmospheric pressure value outside the apparatus, the first atmospheric pressure difference, and/or a test result of the sealing performance of the apparatus. That is, one or more of the first atmospheric pressure value, the atmospheric pressure value outside the apparatus, the first atmospheric pressure difference, and the test result may be displayed in a display interface of the apparatus. When the test result is displayed, the test result may be displayed in one or more forms such as text, sound, and icons in different colors.

A fourth aspect of the embodiments of the present invention provides an apparatus. The apparatus includes: a component used to seal the apparatus, a barometer, a processor, a memory, and a bus. The barometer, the processor, and the memory are in coupling connection with each other by using the bus. The memory is configured to store computer executable program code, and the executable program code includes an instruction. When the processor executes the instruction, the instruction enables the apparatus to perform the sealing performance test method according to the first aspect and the possible implementations of the first aspect. For implementations and beneficial effects of resolving problems of the apparatus, refer to the first aspect and the possible implementations of the sealing performance test method of the first aspect and beneficial effects thereof. Therefore, for implementations of the apparatus, refer to the first aspect and the possible implementations of the sealing performance test method of the first aspect. Repeated descriptions are not provided again.

A fifth aspect of the embodiments of the present invention provides an apparatus. The apparatus includes: a second processing unit, a second calculation unit, and a second determining unit. The second processing unit is configured to: after a component used to seal an apparatus is removed from the apparatus, apply a pressure to the apparatus and maintain the pressure; and when the component used to seal the apparatus is installed in the apparatus and the pressure applied to the apparatus is released, obtain a second atmospheric pressure value inside the apparatus. The second calculation unit is configured to calculate a second atmospheric pressure difference, where the second atmospheric pressure difference is a difference between an atmospheric pressure value outside the apparatus and the second atmospheric pressure value. The second determining unit is configured to determine sealing performance of the apparatus based on the second atmospheric pressure difference. The atmospheric pressure value inside the apparatus may be obtained by using a barometer disposed in a sealed cavity of the apparatus.

The second determining unit may be specifically configured to: determine whether the second atmospheric pressure difference is greater than or equal to a preset second threshold; when the second atmospheric pressure difference is greater than or equal to the preset second threshold, determine that the sealing performance of the apparatus is desirable; or when the second atmospheric pressure difference is less than the preset second threshold, determine that the sealing performance of the apparatus is poor.

The apparatus further includes a display unit. The display unit is configured to display the second atmospheric pressure value, the atmospheric pressure value outside the apparatus, the second atmospheric pressure difference, and/or a test result of the sealing performance of the apparatus.

A sixth aspect of the embodiments of the present invention provides an apparatus. The apparatus includes: a component used to seal the apparatus, a barometer, a processor, a memory, and a bus. The barometer, the processor, and the memory are in coupling connection with each other by using the bus. The memory is configured to store computer executable program code, and the executable program code includes an instruction. When the processor executes the instruction, the instruction enables the apparatus to perform the sealing performance test method according to the second aspect and the possible implementations of the second aspect. For implementations and beneficial effects of resolving problems of the apparatus, refer to the second aspect and the possible implementations of the sealing performance test method of the second aspect and beneficial effects thereof. Therefore, for implementations of the apparatus, refer to the second aspect and the possible implementations of the sealing performance test method of the second aspect. Repeated descriptions are not provided again.

In the embodiments of the present invention, the sealing performance of the apparatus is determined based on the atmospheric pressure difference between the atmospheric pressure value outside the apparatus and the atmospheric pressure value inside the apparatus. Because no external device for air tightness test is introduced, costs are reduced. In addition, because a connecting pipeline of an external test device does not need to be used, it is avoided that the external connecting pipeline introduces a problem such as a test error, and test accuracy is improved. Because a test procedure is simple, the sealing performance of the apparatus can be relatively quickly determined, and the test efficiency is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-a is a schematic flowchart of a sealing performance test method according to an embodiment of the present invention;

FIG. 1-b is a schematic structural diagram of a partial apparatus and a card tray according to an embodiment of the present invention;

DESCRIPTION OF EMBODIMENTS

Embodiments of the present invention provide a sealing performance test method, an apparatus, and a storage medium, to accurately and efficiently test sealing performance of an apparatus at relatively low costs.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, the apparatus may be referred to as a device such as user equipment (User Equipment, "UE" for short), a mobile station (Mobile Station, "MS" for short), a mobile terminal (Mobile Terminal), a computer, or a microcomputer. The apparatus may communicate with one or more core networks by using a radio access network (Radio Access Network, "RAN" for short). For example, the apparatus may be a mobile phone (or referred to as a "cellular" phone), a computer having a mobile terminal, or the like. For example, the apparatus may alternatively be a portable, pocket-sized, handheld, computer's built-in, or in-vehicle mobile apparatus that exchanges voices and/or data with a radio access network. This is not limited in the present invention. For example, the apparatus further includes a wired access apparatus having a multi-carrier characteristic.

Figure 1A:
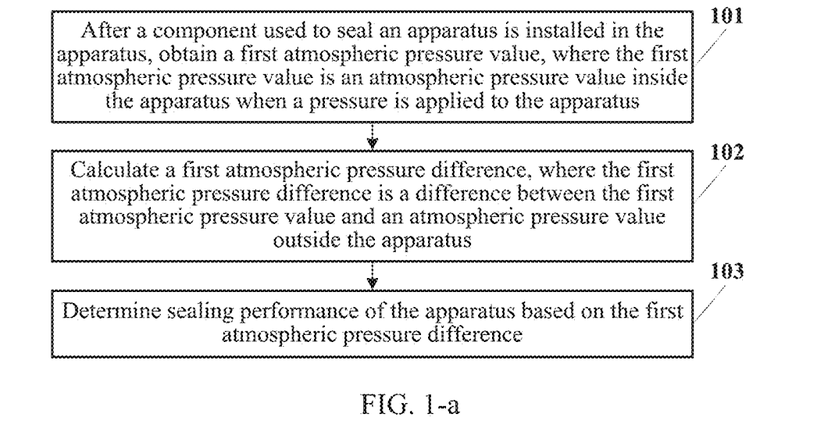

Referring to FIG. 1-*a*, FIG. 1-*a* is a schematic flowchart of a sealing performance test method according to an embodiment of the present invention. The sealing performance test method shown in FIG. 1-*a* may include the following steps:

101: After a component used to seal an apparatus is installed in the apparatus, obtain a first atmospheric pressure value, where the first atmospheric pressure value is an atmospheric pressure value inside the apparatus when a pressure is applied to the apparatus.

The pressure applied to the apparatus may be a pressure applied by a user by directly pressing a surface of the apparatus, or may be a pressure applied to the apparatus by placing an object on the surface of the apparatus. For example, a pressure is applied to the apparatus by placing an object such as a counterpoise with a preset weight on the surface of the apparatus.

If a pressure is applied to the apparatus by placing an object such as a counterpoise with a particular weight, an operation is more convenient, a standard operation is facilitated, and test efficiency is improved. For example, a counterpoise with a weight of 1 kilogram, 1.2 kilograms, 1.5 kilograms, or the like may be placed on the surface of the apparatus.

Optionally, in some possible implementations of the present invention, the component used to seal the apparatus may be first removed from and then installed in the apparatus. Therefore, internal air of the apparatus may first communicate with and then be isolated from external air of the apparatus, so that before the component is installed in the apparatus and a pressure is applied to the apparatus, an atmospheric pressure value inside the apparatus is equal to an atmospheric pressure value outside the apparatus.

The first atmospheric pressure value inside the apparatus may be obtained by using a barometer disposed in a sealed cavity of the apparatus. For example, the first atmospheric pressure value may be obtained by using a barometer installed in a mainboard of the apparatus.

Figure 1B:
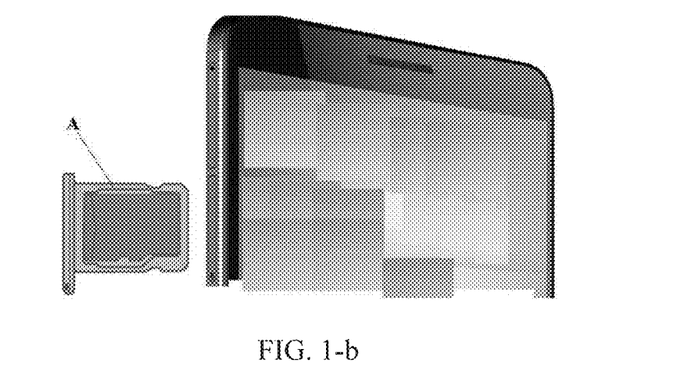

The component used to seal the apparatus may be a card tray A shown in FIG. 1-*b*. After the card tray A is removed, the sealed cavity inside the apparatus may communicate with the external air. The card tray A may be installed in the apparatus to seal the apparatus, so that the sealed cavity inside the apparatus is isolated from the external air.

102: Calculate a first atmospheric pressure difference, where the first atmospheric pressure difference is a difference between the first atmospheric pressure value and an atmospheric pressure value outside the apparatus.

The atmospheric pressure value outside the apparatus may be considered to be equal to one standard atmospheric pressure. Optionally, to improve precision, the atmospheric pressure value outside the apparatus may alternatively be obtained by using a barometer that is electrically connected to the mainboard of the apparatus and that is located outside the sealed cavity of the apparatus. For example, the barometer obtaining the atmospheric pressure value outside the apparatus may be installed inside a headphone jack. It should be understood that, the atmospheric pressure value outside the apparatus may be alternatively obtained by using the barometer disposed inside the sealed cavity of the apparatus when the component used to seal the apparatus is opened. Optionally, the atmospheric pressure value outside the apparatus may be obtained from an external device configured to measure an atmospheric pressure value. For example, an external barometer obtains the atmospheric pressure value and sends the measured atmospheric pressure value to the apparatus in a wired or wireless manner.

103: Determine sealing performance of the apparatus based on the first atmospheric pressure difference.

Specifically, it may be determined whether the first atmospheric pressure difference is greater than or equal to a preset first threshold. The first atmospheric pressure difference is a difference between the first atmospheric pressure value and the atmospheric pressure value outside the apparatus. When the first atmospheric pressure difference is greater than or equal to the preset first threshold, it may be determined that the sealing performance of the apparatus is desirable. When the first atmospheric pressure difference is less than the preset first threshold, it may be determined that the sealing performance of the apparatus is poor.

In this embodiment of the present invention, the sealing performance of the apparatus is determined based on the atmospheric pressure difference between the atmospheric pressure value outside the apparatus and the atmospheric pressure value inside the apparatus. Because no external air tightness test device is introduced, costs are reduced. In addition, because a connecting pipeline of an external test device does not need to be used, it is avoided that the external connecting pipeline introduces a problem such as a test error, and test accuracy is improved. Because a test procedure is simple, the sealing performance of the apparatus can be relatively quickly determined, and test efficiency is improved.

Optionally, in some possible implementations of the present invention, to improve interactivity and test precision, the first atmospheric pressure value, the atmospheric pressure value outside the apparatus, the first atmospheric pressure difference, and/or a test result of the sealing performance of the apparatus may be displayed in a display interface of the apparatus. That is, one or more of the first atmospheric pressure value, the atmospheric pressure value outside the apparatus, the first atmospheric pressure difference, and the test result may be displayed in the display interface of the apparatus. When the test result is displayed, the test result may be displayed in one or more forms such as text, sound, and icons in different colors.

Optionally, in some possible implementations of the present invention, the component used to seal the apparatus may be first removed from and then installed in the apparatus. After the component used to seal the apparatus is removed, the component used to seal the apparatus is installed in the apparatus to isolate the internal air of the apparatus from the external air of the apparatus only when the first atmospheric pressure value inside the apparatus displayed in the display interface is equal to the atmospheric pressure value outside the apparatus. If the sealing performance of the apparatus is desirable, when the component is installed in the apparatus and a pressure is applied to the apparatus, the first atmospheric pressure value increases, and there is a gradual change process because the sealed cavity inside the apparatus is pressed. When there is no change, a corresponding value is used as the first atmospheric pressure value. In this way, test accuracy is improved.

Optionally, in some possible implementations of the present invention, to improve test accuracy, a preset area may be displayed in the display interface of the apparatus, to indicate that the pressure is applied in the preset area. For example, a circle may be displayed in the display interface of the apparatus, indicating that the pressure is applied in the circle.

Optionally, to improve test accuracy, apparatuses of different models may correspond to different first pressure differences.

Figure 2:
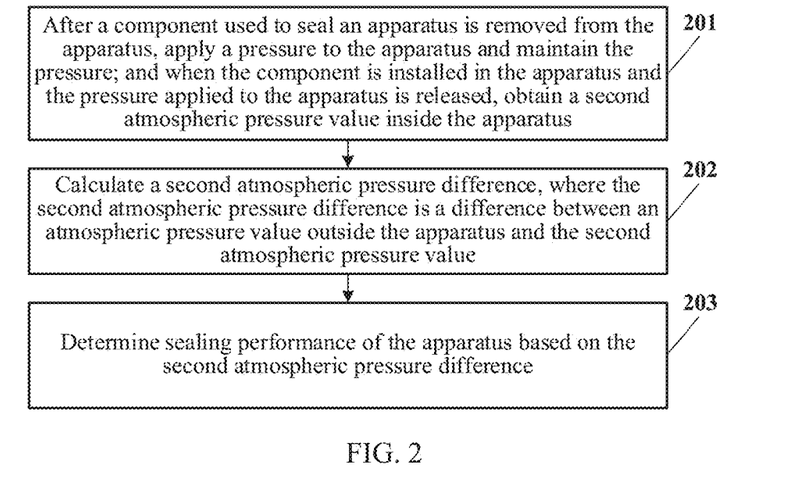
FIG. 2 is a schematic flowchart of another sealing performance test method according to an embodiment of the present invention.

Similarly, in another embodiment, the component used to seal the apparatus may be first opened, a pressure is applied to the apparatus and the applied pressure is maintained, then the component is installed in the apparatus, and next, the pressure applied to the apparatus is released. A pressure difference between an atmospheric pressure value inside the apparatus and an atmospheric pressure value outside the apparatus is tested before and after the pressure applied to the apparatus is released. The sealing performance of the apparatus is determined based on the pressure difference. Specifically, a sealing performance test method shown in FIG. 2 may include the following steps:

201: After a component used to seal an apparatus is removed from the apparatus, apply a pressure to the apparatus and maintain the pressure; and when the component is installed in the apparatus and the pressure applied to the apparatus is released, obtain a second atmospheric pressure value inside the apparatus.

The component used to seal the apparatus may be a component such as a card tray of the apparatus. When the component is removed from the apparatus, a sealed cavity inside the apparatus may communicate with external air. When the component is installed in the apparatus, the sealed cavity inside the apparatus may be isolated from the external air.

The pressure applied to the apparatus may be a pressure applied by a user by directly pressing the surface of the apparatus, or may be a pressure applied to the apparatus by placing an object on the surface of the apparatus. For example, a pressure is applied to the apparatus by placing an object such as a counterpoise with a preset weight on the surface of the apparatus.

If a pressure is applied to the apparatus by placing an object such as a counterpoise with a particular weight, an operation is more convenient, a standard operation is facilitated, and test efficiency is improved. For example, a counterpoise with a weight of 1 kilogram, 1.2 kilograms, 1.5 kilograms, or the like may be placed on the surface of the apparatus.

The second atmospheric pressure value inside the apparatus may be obtained by using a barometer disposed in a sealed cavity of the apparatus. For example, the second atmospheric pressure value may be obtained by using a barometer installed in a mainboard of the apparatus.

202: Calculate a second atmospheric pressure difference, where the second atmospheric pressure difference is a difference between an atmospheric pressure outside the apparatus and the second atmospheric pressure value.

The atmospheric pressure value outside the apparatus may be considered to be equal to one standard atmospheric pressure. Optionally, to improve precision, the atmospheric pressure value outside the apparatus may alternatively be obtained by using a barometer that is electrically connected to the mainboard of the apparatus and that is located outside the sealed cavity of the apparatus. For example, the barometer obtaining the atmospheric pressure value outside the apparatus may be installed inside a headphone jack. It should be understood that, the atmospheric pressure value outside the apparatus may be alternatively obtained by using the barometer disposed inside the sealed cavity of the apparatus when the component used to seal the apparatus is opened. Optionally, the atmospheric pressure value outside the apparatus may be obtained from an external device configured to measure an atmospheric pressure value. For example, an external barometer obtains the atmospheric pressure value and sends the measured atmospheric pressure value to the apparatus.

203: Determine sealing performance of the apparatus based on the second atmospheric pressure difference.

Specifically, it may be determined whether the second atmospheric pressure difference is greater than or equal to a preset second threshold. When the second atmospheric pressure difference is greater than or equal to the preset second threshold, it is determined that the sealing performance of the apparatus is desirable. When the second atmospheric pressure difference is less than the preset second threshold, it is determined that the sealing performance of the apparatus is poor.

In this embodiment of the present invention, the sealing performance of the apparatus is determined based on the atmospheric pressure difference between the atmospheric pressure value outside the apparatus and the atmospheric pressure value inside the apparatus. Because no external device for air tightness test is introduced, costs are reduced. In addition, because a connecting pipeline of an external test device does not need to be used, it is avoided that the external connecting pipeline introduces a problem such as a test error, and test accuracy is improved. Because a test procedure is simple, the sealing performance of the apparatus can be relatively quickly determined, and test efficiency is improved.

Optionally, in some possible implementations of the present invention, to improve interactivity and test precision, the second atmospheric pressure value, the atmospheric pressure value outside the apparatus, the second atmospheric pressure difference, and/or a test result of the sealing performance of the apparatus may be displayed in a display interface of the apparatus. That is, one or more of the second atmospheric pressure value, the atmospheric pressure value outside the apparatus, the second atmospheric pressure difference, and the test result may be displayed in the display interface of the apparatus. When the test result is displayed, the test result may be displayed in one or more forms such as text, sound, and icons in different colors. Optionally, after the component used to seal the apparatus is removed and when a pressure is applied to the apparatus, the pressure applied to the apparatus is released only when the second atmospheric pressure value inside the apparatus displayed in the display interface is equal to the atmospheric pressure value outside the apparatus. In this way, test accuracy is improved.

Optionally, in some possible implementations of the present invention, to improve test accuracy, a preset area may be displayed in the display interface of the apparatus, to indicate that the pressure is applied in the preset area. For example, a circle may be displayed in the display interface of the apparatus, indicating that the pressure is applied in the circle.

Optionally, to improve test accuracy, apparatuses of different models may correspond to different second pressure differences.

Figure 3:
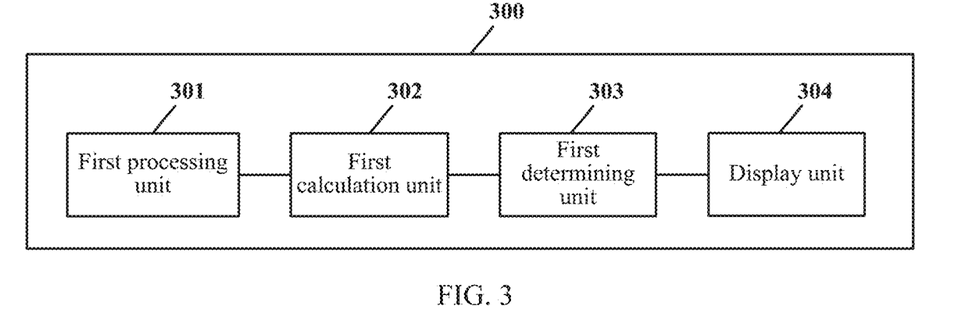
FIG. 3 is a schematic structural diagram of an apparatus according to an embodiment of the present invention.

Referring to FIG. 3, an embodiment of the present invention provides an apparatus. The apparatus has a function of testing sealing performance of the apparatus. Specifically, the apparatus 300 shown in FIG. 3 may include: a first processing unit 301, a first calculation unit 302, and a first determining unit 303.

The first processing unit 301 is configured to perform the method of step 101 in FIG. 1-a in the method embodiment of the present invention. For an implementation of the first processing unit 301, refer to the corresponding description of step 101 in FIG. 1-a in the method embodiment of the present invention, and details are not described herein again.

The first calculation unit 302 is configured to perform the method of step 102 in FIG. 1-a in the method embodiment of the present invention. For an implementation of the first calculation unit 302, refer to the corresponding description of step 102 in FIG. 1-a in the method embodiment of the present invention, and details are not described herein again.

The first determining unit 303 is configured to perform the method of step 103 in FIG. 1-a in the method embodiment of the present invention. For an implementation of the first determining unit 303, refer to the corresponding description of step 103 in FIG. 1-a in the method embodiment of the present invention, and details are not described herein again.

Optionally, in some possible implementations of the present invention, the apparatus further includes a display unit 304, configured to display the first atmospheric pressure value, the atmospheric pressure value outside the apparatus, the first atmospheric pressure difference, and/or a test result of the sealing performance of the apparatus. That is, one or more of the first atmospheric pressure value, the atmospheric pressure value outside the apparatus, the first atmospheric pressure difference, and the test result may be displayed in the display interface of the apparatus.

In this embodiment of the present invention, the apparatus determines the sealing performance of the apparatus based on the atmospheric pressure difference between the atmospheric pressure value outside the apparatus and the atmospheric pressure value inside the apparatus. Because no external device for air tightness test is introduced, costs are reduced. In addition, because a connecting pipeline of an external test device does not need to be used, it is avoided that the external connecting pipeline introduces a problem such as a test error, and test accuracy is improved. Because a test procedure is simple, the sealing performance of the apparatus can be relatively quickly determined, and test efficiency is improved.

It should be noted that, the apparatus may further include a barometer, and the atmospheric pressure value inside the apparatus may be obtained by using the barometer disposed inside a sealed cavity of the apparatus.

Optionally, in some possible implementations of the present invention, the first determining unit 303 is specifically configured to: determine whether the first atmospheric pressure difference is greater than or equal to a preset first threshold; and when the first atmospheric pressure difference is greater than or equal to the preset first threshold, determine that the sealing performance of the apparatus is desirable; or when the first atmospheric pressure difference is less than the preset first threshold, determine that the sealing performance of the apparatus is poor.

Figure 4:
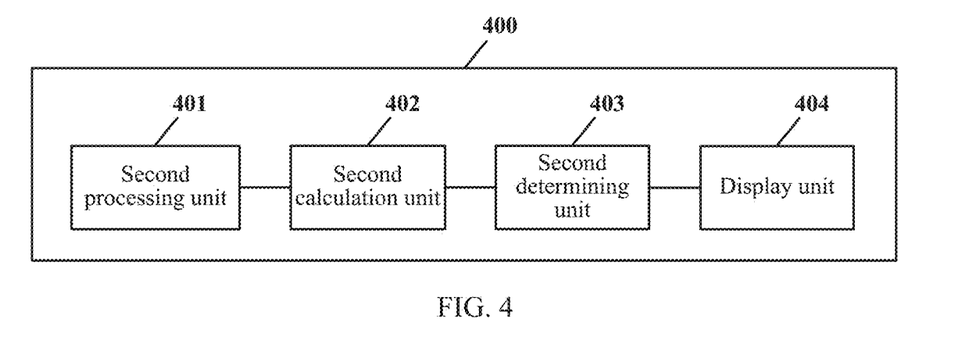
FIG. 4 is a schematic structural diagram of another apparatus according to an embodiment of the present invention.

Referring to FIG. 4, an embodiment of the present invention provides an apparatus. The apparatus has a function of testing sealing performance of the apparatus. Specifically, the apparatus 400 shown in FIG. 4 may include: a second processing unit 401, a second calculation unit 402, and a second determining unit 403.

The second processing unit 401 is configured to perform the method of step 201 in FIG. 2 in the method embodiment of the present invention. For an implementation of the second processing unit 401, refer to the corresponding description of step 201 in FIG. 2 in the method embodiment of the present invention, and details are not described herein again.

The second calculation unit 402 is configured to perform the method of step 202 in FIG. 2 in the method embodiment of the present invention. For an implementation of the second calculation unit 402, refer to the corresponding description of step 202 in FIG. 2 in the method embodiment of the present invention, and details are not described herein again.

The second determining unit 403 is configured to perform the method of step 203 in FIG. 2 in the method embodiment of the present invention. For an implementation of the second determining unit 403, refer to the corresponding description of step 203 in FIG. 2 in the method embodiment of the present invention, and details are not described herein again.

Optionally, in some possible implementations of the present invention, the apparatus further includes a display unit 404, configured to display the second atmospheric pressure value, the atmospheric pressure value outside the apparatus, the second atmospheric pressure difference, and/or a test result of the sealing performance of the apparatus. That is, one or more of the second atmospheric pressure value, the atmospheric pressure value outside the apparatus, the second atmospheric pressure difference, and the test result may be displayed in a display interface of the apparatus.

In this embodiment of the present invention, the apparatus determines the sealing performance of the apparatus based on the atmospheric pressure difference between the atmospheric pressure value outside the apparatus and the atmospheric pressure value inside the apparatus. Because no external device for air tightness test is introduced, costs are reduced. In addition, because a connecting pipeline of an external test device does not need to be used, it is avoided that the external connecting pipeline introduces a problem such as a test error, and test accuracy is improved. Because a test procedure is simple, the sealing performance of the apparatus can be relatively quickly determined, and test efficiency is improved.

It should be noted that, the apparatus may further include a barometer, and the atmospheric pressure value inside the apparatus may be obtained by using the barometer disposed inside a sealed cavity of the apparatus.

Optionally, in some possible implementations of the present invention, the second determining unit 403 is specifically configured to: determine whether the second atmospheric pressure difference is greater than or equal to a preset second threshold; when the second atmospheric pressure difference is greater than or equal to the preset second threshold, determine that the sealing performance of the apparatus is desirable; or when the second atmospheric pressure difference is less than the preset second threshold, determine that the sealing performance of the apparatus is poor.

Figure 5:
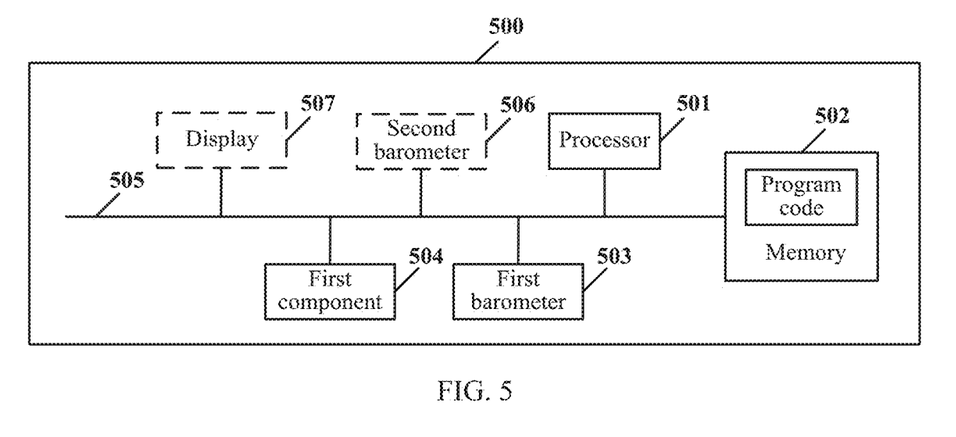
FIG. 5 is a schematic structural diagram of another apparatus according to an embodiment of the present invention.

Referring to FIG. 5, FIG. 5 shows an apparatus 500 according to an embodiment of the present invention. The apparatus 500 has a function of testing sealing performance of the apparatus. Specifically, the apparatus 500 shown in FIG. 5 may include: a processor 501, a memory 502, a first barometer 503, a first component 504 used to seal the apparatus, and a bus 505. The processor 501, the memory 502, the first barometer 503, and the first component 504 are in coupling connection with each other by using the bus 505. It should be noted that, in some possible implementations of the present invention, the apparatus 500 may further include a second barometer 506, configured to measure an atmospheric pressure value outside the apparatus 500.

The memory 502 is configured to store computer executable program code, where the executable program code includes an instruction. When the processor 501 executes the instruction, the instruction executes the method of the method embodiments of the present invention. Refer to the method of step 101 to step 103 in FIG. 1-*a*, or refer to the method of step 201 to step 203 in FIG. 2 and the corresponding descriptions of the execution process of the apparatus in the method embodiments. Details are not described herein again.

In some possible implementations of the present invention, the apparatus 500 further includes a display 507, configured to display the first atmospheric pressure value, the atmospheric pressure value outside the apparatus, the first atmospheric pressure difference, and/or a test result of the sealing performance of the apparatus. That is, one or more of the first atmospheric pressure value, the atmospheric pressure value outside the apparatus, the first atmospheric pressure difference, and the test result may be displayed in a display interface of the display 507.

Alternatively, the display 507 is configured to display the second atmospheric pressure value, the atmospheric pressure value outside the apparatus, the second atmospheric pressure difference, and/or a test result of the sealing performance of the apparatus. That is, one or more of the second atmospheric pressure value, the atmospheric pressure value outside the apparatus, the second atmospheric pressure difference, and the test result may be displayed in a display interface of the display 507.

Based on a same inventive idea, a principle of resolving problems by the apparatus provided in the embodiments of the present invention is similar to that of the seal performance test method in the method embodiment of the present invention. Therefore, for implementation of the apparatus, refer to the implementation of the method. For concise descriptions, details are not described herein again.

In this embodiment of the present invention, the sealing performance of the apparatus is determined based on the atmospheric pressure difference between the atmospheric pressure value outside the apparatus and the atmospheric pressure value inside the apparatus. Because no external device for air tightness test is introduced, costs are reduced. In addition, because a connecting pipeline of an external test device does not need to be used, it is avoided that the external connecting pipeline introduces a problem such as a test error, and test accuracy is improved. Because a test procedure is simple, the sealing performance of the apparatus can be relatively quickly determined, and test efficiency is improved.

An embodiment of the present invention further provides a computer storage medium. The computer storage medium may store a program. When the program is executed, some or all steps of any one of the sealing performance test methods described in the method embodiments are performed.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may be specifically a processor in a computer device) to perform all or a part of the steps of the foregoing methods described in the embodiments of the present invention. The foregoing storage medium includes: any medium that can store program code, such as a USB flash drive, a removable hard disk, a magnetic disk, an optical disc, a read-only memory (ROM, Read-Only Memory), or a random access memory (RAM, Random Access Memory).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A sealing performance test method, comprising:
    applying a pressure to a surface of an apparatus using a weight;
    maintaining the pressure until sealing the apparatus;
    sealing the apparatus;
    releasing the pressure applied to the apparatus after sealing the apparatus;
    obtaining a first atmospheric pressure value inside the apparatus after the apparatus is sealed and the pressure applied to the apparatus is released;
    obtaining a second atmospheric pressure value outside the apparatus;
    calculating an atmospheric pressure difference, wherein the atmospheric pressure difference is a difference between the second atmospheric pressure value and the first atmospheric pressure value; and
    determining sealing performance of the apparatus based on the atmospheric pressure difference.

2. The sealing performance test method of claim 1, wherein the first atmospheric pressure value is obtained using a barometer disposed in a sealed cavity of the apparatus.

3. The sealing performance test method of claim 1, wherein determining the sealing performance of the apparatus comprises:
    determining that the sealing performance of the apparatus is acceptable based on a determination that the atmospheric pressure difference is greater than or equal to a preset threshold; and
    determining that the sealing performance of the apparatus is unacceptable based on a determination that the atmospheric pressure difference is less than the preset threshold.

4. The sealing performance test method of claim 1, further comprising displaying, in a display interface of the apparatus, the first atmospheric pressure value.

5. The sealing performance test method of claim 1, further comprising displaying, in a display interface of the apparatus, the second atmospheric pressure value.

6. The sealing performance test method of claim 1, further comprising displaying, in a display interface of the apparatus, the atmospheric pressure difference.

7. The sealing performance test method of claim 1, further comprising displaying, in a display interface of the apparatus, a determination of the sealing performance of the apparatus.

8. An apparatus, comprising:
    at least one processor;
    a component configured to seal the apparatus;
    a barometer coupled to the at least one processor; and
    at least one memory coupled to the at least one processor and configured to store computer instructions for execution by the at least one processor, wherein the computer instructions cause the at least one processor to be configured to:
        obtain, using the barometer, a first atmospheric pressure value inside the apparatus when a pressure applied to the apparatus is released, wherein the pressure is applied on a surface of the apparatus using a weight, wherein the pressure is applied to the apparatus when the apparatus is unsealed, wherein the pressure is maintained until the apparatus is changed from an unseal state to a sealed state, and wherein the first atmospheric pressure value is obtained after the apparatus is changed from the unseal state to the sealed state;
        obtain, using the barometer, a second atmospheric pressure value outside the apparatus;
        calculate an atmospheric pressure difference, wherein the atmospheric pressure difference is a difference between the second atmospheric pressure value and the first atmospheric pressure value; and
        determine sealing performance of the apparatus based on the atmospheric pressure difference.

9. The apparatus of claim 8, wherein when determining the sealing performance, the computer instructions further cause the at least one processor to be configured to:
    determine that the sealing performance of the apparatus is acceptable based on a determination that the atmospheric pressure difference is greater than or equal to a preset threshold; and
    determine that the sealing performance of the apparatus is unacceptable based on a determination that the atmospheric pressure difference is less than the preset threshold.

10. The apparatus of claim 8, wherein the computer instructions further cause the at least one processor to be configured to display the first atmospheric pressure value.

11. The apparatus of claim 8, wherein the computer instructions further cause the at least one processor to be configured to display the second atmospheric pressure value.

12. The apparatus of claim 8, wherein the computer instructions further cause the at least one processor to be configured to display the atmospheric pressure difference.

13. The apparatus of claim 8, wherein the computer instructions further cause the at least one processor to be configured to display a determination of the sealing performance of the apparatus.

* * * * *